(12) United States Patent
    Manderbacka

(10) Patent No.: US 8,910,624 B2
(45) Date of Patent: Dec. 16, 2014

(54) SOLAR COLLECTOR, COLLECTOR ELEMENT, BUILDING ROOF, BUILDING, AND SOLAR ENERGY RECOVERY SYSTEM

(71) Applicant: Double M Properties Ab, Karleby (FI)

(72) Inventor: Mats Manderbacka, Karleby (FI)

(73) Assignee: Double M Properties Ab, Karleby (FI)

( * ) Notice: Subject to any disclaimer, the term of this patent is extended or adjusted under 35 U.S.C. 154(b) by 0 days.

(21) Appl. No.: 14/045,204

(22) Filed: Oct. 3, 2013

(65) Prior Publication Data
    US 2014/0096762 A1    Apr. 10, 2014

(30) Foreign Application Priority Data
    Oct. 4, 2012   (FI) ...................................... 20126038

(51) Int. Cl.
    *F24J 2/20*       (2006.01)
    *F24J 2/52*       (2006.01)

(52) U.S. Cl.
    CPC *F24J 2/205* (2013.01); *Y02B 10/20* (2013.01); *Y02E 10/47* (2013.01); *F24J 2/208* (2013.01); *F24J 2/5201* (2013.01); *Y02E 10/44* (2013.01)
    USPC ........... 126/621; 126/623; 126/634; 126/655; 126/660; 126/663

(58) Field of Classification Search
    CPC ................ F24J 2/045; F24J 2/26; F24J 2/24; F24J 2/22; F24J 2/5211; F24J 2/5262; F24J 2002/0061; F24J 2002/4665
    USPC ......... 126/621, 623, 634, 655, 660, 663, 704, 126/713, 907; 52/536, 553; 165/168, 171, 165/176
    See application file for complete search history.

(56) References Cited

U.S. PATENT DOCUMENTS

| 2,594,232 | A | * | 4/1952 | Stockstill ...................... 165/171 |
| 3,384,167 | A | * | 5/1968 | Javkin ............................ 165/171 |
| 4,111,188 | A | | 9/1978 | Murphy, Jr. |

FOREIGN PATENT DOCUMENTS

| BE | 895470 A2 | 4/1983 |
| DE | 26 36 533 A1 | 3/1977 |
| DE | 29 00 251 A1 | 12/1980 |
| DE | 94 08 608 U1 | 9/1994 |
| EP | 0 879 996 A1 | 5/1998 |
| FR | 2 469 674 A1 | 5/1981 |
| FR | 2 591 322 A1 | 6/1987 |
| GB | 2 439 191 A | 12/2007 |

OTHER PUBLICATIONS

Search Report of Finnish Patent Application No. 20126038, dated Jul. 26, 2013.

* cited by examiner

*Primary Examiner* — Alfred Basichas
(74) *Attorney, Agent, or Firm* — Sughrue Mion, PLLC

(57) ABSTRACT

The invention relates to a solar collector (1) comprising a collector element plane comprising a set of parallel metallic collector elements (2) for collecting solar energy. The collector element plane, on its side to be arranged to face the sun, comprises a set of parallel, elongated ridges (R, r) formed by the metallic collector elements (2), and elongated depressions (v) between the ridges (R, r), and that at least some of the ridges (R, r) comprise therein a channel (3) for a heat transfer medium. The invention also relates to a collector element. The invention further relates to a building roof, a building, and a solar energy recovery system comprising said solar collector (1).

22 Claims, 2 Drawing Sheets

SOLAR COLLECTOR, COLLECTOR ELEMENT, BUILDING ROOF, BUILDING, AND SOLAR ENERGY RECOVERY SYSTEM

FIELD OF THE INVENTION

The invention relates to a solar collector, a collector element, a building roof, a building, and a solar energy recovery system.

BACKGROUND OF THE INVENTION

Solar collectors are previously known which comprise a collector element plane to absorb sun beams and in which heat generated by the sun beams and collected by the collector elements comprised by the collector element plane is arranged to be conveyed to a heat transfer medium pipework. By flowing a heat transfer medium via the pipework, the heat collected in the collector elements may be transferred as a continuous flow to a desired target. The heat is removed from the pipework and utilized. For instance, heat may be transferred from the flowing heat transfer medium to heat a building's interior or household water. Heat may also be stored for later demand e.g. by conveying it to a heat reservoir, such as a heat storage field. Problems with prior art solutions have been that they have been complex in structure, expensive to manufacture, and yet susceptible to structural damage. Solar collectors to be utilized in connection with a building roof in particular have been susceptible to damage under poor weather conditions. Their structure has not e.g. behaved advantageously in conditions where snow and ice collect on the solar collector. The structure may have bent, been broken or let water leak therethrough or water, ice or leaves to collect thereon. Therefore, it has usually been necessary to place the solar collector above the roof, as a structure separate from the actual roof. Consequently, a possible breakage of the structure of the solar collector has not harmed the actual building. In view of the above, a need has arisen for a better solar collector structure. Some prior art solutions are disclosed inter alia in FR2469674A1, DE9408608U1, and US2012222371A1.

BRIEF DESCRIPTION OF THE INVENTION

An object of the invention is to solve the aforementioned prior art problems as well as problems brought forth in the description of the invention below. An object is inter alia to provide a solution which enables solar energy to be collected and which is sustainable and efficient in solar energy recovery. Embodiments are disclosed which, inter alia, enable a strong structure and efficient solar energy recovery to be achieved in an inexpensive manner as far as manufacturing costs are concerned. Embodiments are also disclosed which enable a solar collector to be used for forming a building roof. Embodiments are disclosed which, inter alia, enable snow, water, and ice to become efficiently carried off the solar collector.

The solar collector according to the invention comprises a collector element plane comprising a set of parallel metallic collector elements absorbing sun beams for collecting solar energy. The collector element plane, on its side to be arranged to face the sun, comprises a set of parallel, elongated ridges formed by the metallic collector elements, and elongated depressions between the ridges, and at least some of the ridges comprise therein a channel for a heat transfer medium. Consequently, a solar collector is achieved which is durable and efficient in solar energy recovery.

In a preferred embodiment, the metallic collector elements are profile pieces, each having a transverse profile that continues in a longitudinal direction of the profile piece substantially the same. Thus, the solar collector is simple to manufacture and highly suitable for enclosing therein a long channel for a heat transfer medium.

In a preferred embodiment, the metallic collector elements are each extruded profile pieces. Thus, the collector elements are simple and inexpensive to manufacture to have profiles that continue substantially the same in the longitudinal direction. The process also enables extremely long collector elements to be formed, and the lengths of the collector elements to be adapted accurately to be optimal as far as an installation site is concerned, e.g. by cutting long profiles into appropriate lengths. This enables even extremely long collector elements of a desired length to be manufactured which are profile pieces having a channel running therein which is open at its ends only. The process is capable of producing even a complex shape having an integral structure in a simple manner and with a uniform quality.

In a preferred embodiment, the metallic collector elements are each made of aluminum or aluminum alloy. The advantage then is, inter alia, good thermal conductivity and good applicability to the manufacture of collector elements by an extrusion process. Owing to the aluminum material, the collector elements are also strong, and the solar collector is highly suitable for forming a part of a roof.

In a preferred embodiment, the collector elements are supported against one another substantially gaplessly. In such a case, they together form a substantially gapless collector element plane. Thus, no separate channel parts and plane parts are necessary for forming a tight solar collector.

In a preferred embodiment, the solar collector comprises a substantially solar radiation permeable coating on top of the collector element plane, on top of the collector elements thereof in particular, which forms at least a part of an outer surface of the solar collector. An advantage of the coating is its capacity to protect the collector elements and insulate the collector elements from outdoor air, thus reducing the cooling effect of the air. The permeability to solar radiation enables efficient heating up of the collector elements due to the influence of the radiation. Preferably, the coating is permeable to visible light at least in the incoming direction of a sun beam. Preferably, the coating is transparent, e.g. clear. Thus, also the visible light ends up on the surface of the collector element and contributes to heating it up.

In a preferred embodiment, the coating is substantially permeable to solar radiation and substantially impermeable to water or air. The impermeability to water protects the collector element plane and its structures. Thus, it also enhances the waterproofness of the solar collector and contributes to enabling the solar collector to be used as a part of a building roof. The impermeability to air insulates the collector elements efficiently from outdoor air, thus reducing the cooling effect of the outdoor air on the collector elements.

In a preferred embodiment, an air gap/air gaps is/are provided between the collector element plane, preferably its ridges inside of which a channel is provided for a heat transfer medium, and the coating. Preferably, the surface of the ridge and the surface of the coating define this air gap. The air gap forms an efficient insulator between outdoor air and the collector element, thus reducing the cooling effect of the outdoor air on the collector elements.

In a preferred embodiment, an air gap/air gaps is/are provided between a flank/flanks and/or a peak of the ridges inside of which a channel is provided for a heat transfer medium, and the coating. The flanks form one of the most heated-up spots in the collector element. Insulating this spot in particular from outdoor air reduces the cooling effect of the outdoor air on the collector elements.

In a preferred embodiment, the coating is supported at least on bottoms of the depressions and/or the channelless ridges. The bottoms of the depressions and the channelless ridges each form a point of the collector element at which the coating may be supported on the collector element without causing a problematic heat loss through the support since the structures are not provided in the immediate vicinity of the channel.

In a preferred embodiment, the coating is in the form of a plate. A plate is simple and inexpensive to manufacture. It is simple to make the plate impermeable e.g. to air and/or water. It is also simple and inexpensive to make it thin the incoming direction of radiation, in which case it has a good permeability to radiation.

In a preferred embodiment, the coating is made of plastic. Plastic is inexpensive, easy to shape, easy to make impermeable to water and air, and its thermal conductivity is not high. Preferably, the coating is in the form of a plastic plate. Preferably, the plate is bent, in which case it may have been provided with a shape complying with the collector element plane therebelow. Preferably, the material thickness of the coating is uniform.

In a preferred embodiment, the lengths of the collector elements are at least 2 meters, more preferably at least 3 meters. Thus, the solar collector may form a significant part of the roof with few seam points.

In a preferred embodiment, the coating is non-planar and shaped to comply with the shapes of a support element plane therebelow. Thus, its outer surface may be shaped to efficiently carry water, snow, and tree leaves landing thereon off its surface. This also enables the stiffness of the coating to be increased and the coating to be supported elsewhere than on the ridges provided with channels.

In a preferred embodiment, the coating continues unbroken across a plurality of ridges.

In a preferred embodiment, on its side to be arranged to face the sun (on its side oriented directly or diagonally upwards), the coating comprises elongated ridges into the inside of which (on the backside) the ridges of the collector elements extend, and between the ridges elongated depressions which extend into the inside of the depressions of the collector elements. Consequently, the endurance to load and the heat recovery capacity of the structure are good. When the outer surface of the solar collector is thus shaped, the ridges stay well clean.

In a preferred embodiment, the heat transfer medium channel resides at the point of the peak of the ridge. Thus, irrespectively of variation in the direction of solar radiation, heat is always quickly conveyed from the spot in the ridge that at a given moment heats up the most (e.g. from the flank of a ridge with a channel or from the peak of a ridge) into the channel.

In a preferred embodiment, only one channel is provided inside the ridge. This enables the ridge to be made narrow and have a large surface area per channel.

In a preferred embodiment, on the side to be arranged to face the sun, the shape of the outer surface of the ridge and the shape of the heat transfer medium channel are symmetrical with respect to a vertical plane (in the longitudinal direction of the ridge) passing through the peak of the ridge. Thus, irrespective of variation in the direction of solar radiation, heat is always quickly conveyed into the channel.

In a preferred embodiment, the ridge comprises a peak and, on opposite sides of the peak, flanks inclined in different directions, between which a heat transfer medium channel is provided. Thus, irrespective of variation in the direction of solar radiation, heat is always quickly conveyed into the channel.

In a preferred embodiment, the coating is in the form of a bent plate. This makes it simple to adapt to comply with the shapes of the collector element plane.

In a preferred embodiment, the flanks of a ridge provided with a channel therein are flat. Thus, its structure is simple and capacity for solar radiation reception good. It is also simple to arrange and manufacture a coating in the form of a bent plate on top of it since spans between bends may be left straight.

In a preferred embodiment, the ridge provided with a channel therein further comprises therein an interior space, which is preferably an empty space.

In a preferred embodiment, the collector elements comprise at the ridges provided with channels recesses on their backside. Consequently, the thermal insulation capacity of the backside of the collector elements is good since an air gap may thus be formed between the backside and a mounting base, such as a roof truss structure. When the solar collector is used for forming a part of a roof, this air gap may also increase the air change rate between the roof and the roof truss.

In a preferred embodiment, the ridges inside each of which a channel is provided cover at least a majority, preferably at least 70%, preferably at least 80%, of the cross-sectional area of the collector elements.

In a preferred embodiment, a heat transfer medium is conveyed or may be conveyed to run via the channel.

In a preferred embodiment, each said collector element is a single-piece element which is made of the same material and which forms a light-receiving outer surface of a ridge provided with a channel. Preferably, the heat transfer medium channel is an integral part of the collector element. Thus, the structure is simple, yet still efficient as far as heat transfer is concerned. This also makes the solar collector durable, which makes it easier to use inter alia as a part of a roof.

In a preferred embodiment, some of the elongated ridges formed by the collector elements comprise therein no channel for a heat transfer medium. When desired, these channelless ridges may be used for forming a tight joining point between collector elements next to each other in a simple manner. The channelless ridges may also or alternatively be used for increasing the total number of ridges to be a great one even if the channels were not densely set. This enables inter alia the surface area of an element plane to be increased. Similarly, this enables the stiffness of the solar collector to be affected.

In a preferred embodiment, the solar collector comprises a set of ridges comprising therein a channel for a heat transfer medium, and a set of ridges comprising therein no channel for a heat transfer medium, alternately in parallel. This enables the aforementioned advantages of the channelless ridges to be utilized efficiently. This enables inter alia a great stiffness and surface area to be achieved.

In a preferred embodiment, the ridges comprising therein no channel for a heat transfer medium are lower than the ridges comprising therein a channel for a heat transfer medium. Thus, the channelless ridges form no structure to overshadow the ridges provided with channels, but they nevertheless do provide the advantages mentioned elsewhere.

In a preferred embodiment, the solar collector comprises ridges next to each other comprising therein a channel for a heat transfer medium, between which is provided a ridge comprising therein no channel for a heat transfer medium.

In a preferred embodiment, each said collector element comprises only one ridge provided therein with a channel for a heat transfer medium. Thus, the collector element is inexpensive and simple to form. The process apparatus inter alia may be formed in a simple and inexpensive manner. For instance, when manufacturing by extrusion, the extrusion process is simple to control since this enables profiles having small cross sections to be formed.

In a preferred embodiment, a seam point is provided between collector elements next to each other at a channelless ridge. A seam at a ridge may be formed simply so that the seam is tight.

In a preferred embodiment, the coating continues unbroken across the seam point. Consequently, the coating contributes to making the seam point tight.

In a preferred embodiment, collector elements next to each other comprise inclined longitudinal edges set to overlap against one another. Preferably, one of the collector elements next to each other comprises a longitudinal edge oriented diagonally downwards, and the other of the collector elements next to each other comprises a longitudinal edge oriented diagonally upwards, the longitudinal edges being set to overlap so that the diagonally downwards oriented longitudinal edge covers the upwards oriented longitudinal edge. Particularly, the downwards oriented longitudinal edge extends in the thickness direction of the collector element below the plane of the uppermost point of the upwards oriented longitudinal edge. The structure enables, even if water ended up at the seam point where the collector elements next to each other are jointed together, the water to flow off without entering the seam.

In a preferred embodiment, the metallic collector element forms inner walls of the channel. Preferably, the channel for a heat transfer medium is tubular. Preferably, except for passage openings provided in opposite ends of the collector element, it is closed. Preferably, the channel comprises the inner walls formed by the metallic collector element for guiding the heat transfer medium in the channel. Preferably, the channel is transversely with respect to its longitudinal direction completely surrounded by the collector element.

The collector element according to the invention for collecting solar energy is made of metal and comprises an elongated ridge provided therein with a channel for a heat transfer medium. The ridge enables solar radiation to be collected efficiently, irrespective of variations in the position of the sun. Heat conducts efficiently through the metal into the channel provided inside the ridge. Further, the collector element preferably has features and advantages associated therewith described above and elsewhere in the application.

In a preferred embodiment, the ridge comprises a peak and, on opposite sides of the peak, flanks inclined in different directions, between which the heat transfer medium channel is provided. Preferably, the ridge is completely between the flanks.

In a preferred embodiment, the collector element is a profile piece whose transverse profile continues in a longitudinal direction of the profile piece substantially the same. Preferably, the collector element is an extruded profile piece. Preferably, the collector element is made of aluminum or aluminum alloy.

In a preferred embodiment, the collector element comprises at the ridge a recess on its backside. Preferably, the collector element comprises only one such ridge.

In a preferred embodiment, the collector element comprises, on opposite sides of the ridge, longitudinal edges oriented towards the front of the collector element. These longitudinal edges are preferably formed to constitute counterparts for each another, in which case when fitting the collector elements together, the longitudinal edges of the collector elements next to each other form counterparts for each other. This enables similar collector elements to be placed side by side to form together a tight collector element plane.

The building roof according to the invention for collecting solar energy comprises any solar collector of the above-described kind which forms at least a part of a building roof, particularly at least a part of its waterproof structure. Consequently, no separate solar collector needs to be mounted on top of the roof. An entity is inexpensive to manufacture since no large number of superimposed structures is needed. Similarly, the solar collector is simple to make to have a very large surface area when it is arranged to form a part of the roof. Preferably, the solar collector also forms a part of a solar energy recovery system, which is described in closer detail in the following paragraphs and elsewhere in the application.

The building according to the invention comprises any solar collector of the above-described kind. Preferably, the solar collector forms at least a part of a building roof, particularly at least a part of a waterproof structure of the building roof. Thus, the building is energy-efficient and yet inexpensive to manufacture. Preferably, the solar collector also forms a part of a solar energy recovery system, which is described in closer detail in the following paragraphs and elsewhere in the application.

In a preferred embodiment, the solar collector is supported on a roof truss located below the roof. The roof truss may be made of wood, for instance. Preferably, it is fastened to beams of the roof truss.

In a preferred embodiment, the solar collector is preferably placed such that its ridges and depressions are oriented diagonally downwards.

The solar energy recovery system according to the invention comprises any solar collector or building roof or building or collector element of the above-described kind, and means for conveying a heat transfer medium via the heat transfer medium channel. The heat transfer medium conveyed via the channel may be e.g. a liquid, such as water or an aqueous liquid or any appropriate equivalent.

Preferably, the recovery system comprises means for removing heat off the heat transfer medium. Preferably, these means comprise means for transferring heat to where the heat is to be used or to a heat reservoir. The heat reservoir may be in the form of an underground heat storage field, for instance. The solar collector may comprise collector elements covered with a covering and non-covered collector elements coupled in series, in which case in the recovery system the heat transfer medium is arranged to run via the collector elements not covered with the covering and, subsequently, via the collector elements covered with the covering. Consequently, the collector elements not covered with the covering and the collector elements covered with the covering and placed in series may form a pre-heating phase and a superheating phase.

BRIEF DESCRIPTION OF THE FIGURES

The invention is now described in closer detail in connection with preferred embodiments, with reference to the accompanying drawings, in which.

DETAILED DESCRIPTION OF THE INVENTION

Figure 1:
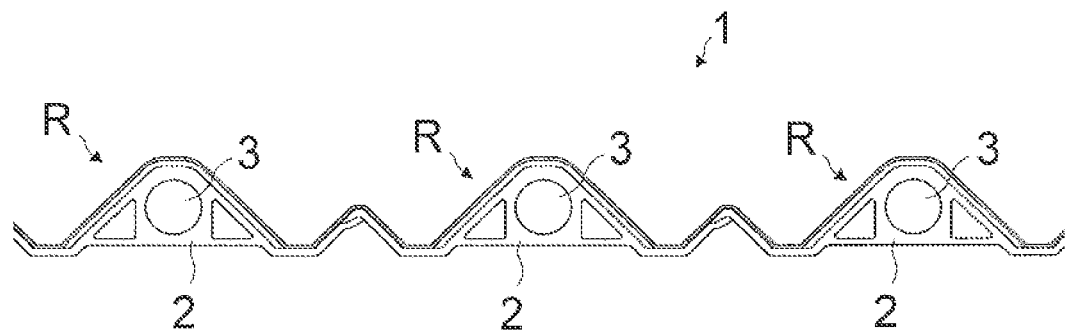
FIG. 1 shows a solar collector according to an embodiment.
Figure 2:
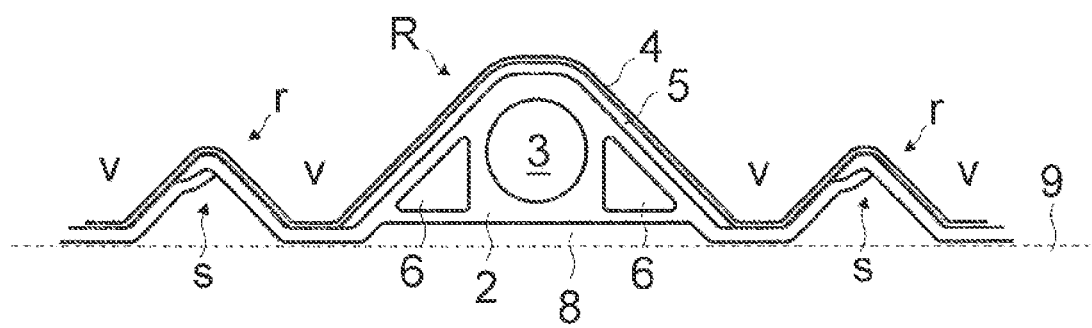
FIG. 2 shows an enlargement of FIG. 1.
Figure 3:
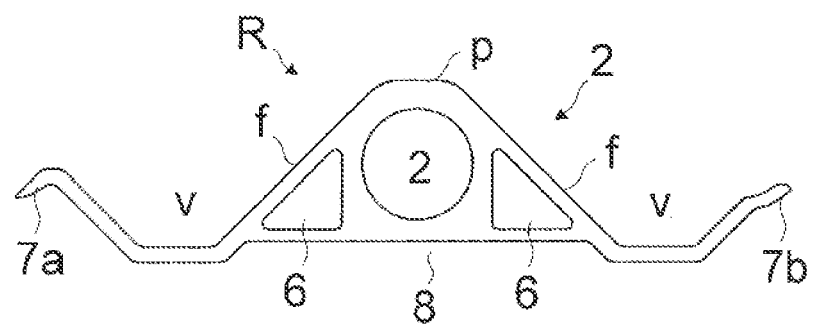
FIG. 3 shows a collector element according to an embodiment.
Figure 4:
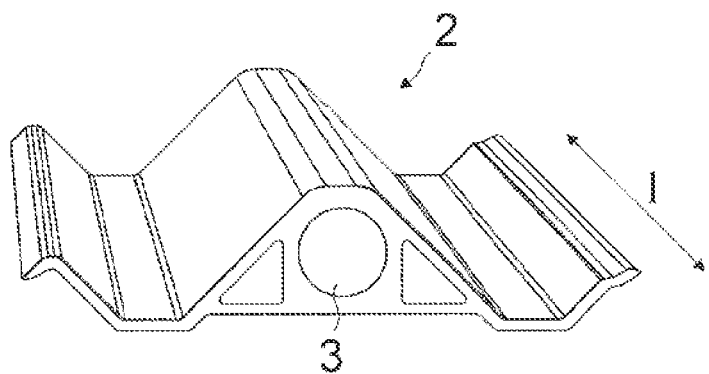
FIG. 4 shows, three-dimensionally, the collector element of FIGS. 1 to 3.

FIG. 1 shows a cross section of a solar collector 1 according to an embodiment, shown from a direction of its end, the solar collector 1 comprising a collector element plane comprising a set of parallel, metallic, sun-beam-absorbing collector elements 2 for collecting solar energy. Preferably, the collector elements 2 are supported against one another substantially gaplessly, in which case they form together a collector element plane substantially without openings, as shown in FIG. 1. The structure of the solar collector 1 is continuous in a depth direction in accordance with the shown cross section. The solar collector 1 may further comprise fastening and/or support means for fastening the collector elements to one another or to a base (not shown). The solar collector 1, particularly its collector element plane, on its side to be arranged to face the sun (in the figure the side facing upwards), comprises a set of parallel, elongated ridges R, r formed by the metallic elements 2, and elongated depressions v between the ridges R, r, and at least some of the ridges R, r comprise therein an elongated channel 3 for a heat transfer medium. The channel 3 comprises inner walls for guiding the heat transfer medium in the channel. The ridge R absorbs solar radiation efficiently, irrespective of the direction of the radiation, and conveys the generated heat directly into the channel 3 running therein.

The metallic collector elements 2 are metallic elongated profile pieces, each having a transverse profile that preferably in the longitudinal direction of the profile piece continues substantially the same. However, the collector element may be provided with fastening apertures or fastening shapes or the ends of the collector elements may be provided with connection shapings in order to achieve a tight connection between possibly successive collector elements or between the collector element and an end structure, the end structure (not shown) guiding the heat transfer medium out of the solar collector. Preferably, the metallic collector elements 2 are manufactured by extruding. Thus, their cross sections (transverse profiles) are simple to form to continue the same. It is thus also simple to manufacture a long collector element comprising tubular interior spaces. The collector elements may be manufactured either to cover substantially the entire length of the collector element plane or to place a plurality of collector elements successively. The lengths l of the collector elements 2 are also simple to adapt to suit the site of installation by cutting profile pieces of suitable lengths from the extruded, long profile. After extrusion, shapes may be machined in the profile for a fastening or a connection shaping. Preferably, each of the metallic collector elements 2 is made of aluminum or aluminum alloy. Consequently, their heat transfer properties are advantageous and they are simple to manufacture. The extrusion of aluminum material in particular is simple to implement.

The solar collector 1 preferably comprises, as shown in the embodiment of FIG. 1, a coating 4 substantially permeable to sun beams and located on top of the collector element plane and forming at least a part of the outer surface of the solar collector 1. Preferably, the coating 4 has a good permeability to sun beams, and a substantial impermeability to water or air. The coating 4 may cover the entire collector element plane of the solar collector 1, or only a part of the collector element plane of the solar collector. However, it is advantageous that the coating 4 continues unbroken across a plurality of ridges R, in which case its insulating effect and protecting effect become emphasized. The coating 4 may prevent water from entering between the collector elements and further into structures therebelow, making the solar collector waterproof. The coating 4 continues in the direction of the ridges R of the collector elements preferably across the entire length of the collector element plane. A further advantage of the coating 4 is that it protects the collector elements 2 from damage and prevents water from coming into contact therewith. The material of the coating preferably has a good permeability to solar radiation, but a poor thermal conductivity, in which case it has a heat-insulating effect. Thus, the cooling effect of outdoor air on the collector elements 2 may be reduced. These properties are achieved inter alia if the coating 4 is made of clear plastic. In the disclosed preferred embodiment, the coating 4 is in the form of a bent plastic plate. Preferably, the material thickness of the coating 4 is uniform, as also shown in the figures, which is readily achievable when the coating 4 is in the form of a bent plastic plate.

The coating 4 is non-planar and shaped to comply with the shapes of a support element plane therebelow. In particular, the coating 4, on its side to be arranged to face the sun, comprises elongated ridges into the inside of which (on the backside of the coating) the ridges R of the collector elements extend. Thus, the coating 4 and the support element plane can, with their shapings, form counterparts for each other. The coating 4 further comprises between the ridges elongated depressions which extend into the inside of the depressions v of the collector elements. Thus, the coating forming the outer surface of the solar collector is considerably stiffer than a flat plate, and it becomes possible to support it on points of the collector element plane provided between the ridges R. Consequently, the structure becomes more resistant to load while the heat recovery capacity still remains good. When the outer surface of the solar collector is thus shaped, the ridges stay clean even if snow or debris were collected on the outer surface of the solar collector 1. Dirt or tree leaves collecting on the surface end up in the depressions while the ridges, which are important as far as heat recovery is concerned, stay clean. Rain flushes the bottoms of the depressions of the surface, efficiently removing collected dirt off the surface of the solar collector.

The coating 4 is placed on top of the collector elements 2 such that an air gap/air gaps 5 is/are provided between the collector element plane, in particular its ridges R inside of which a channel 2 is provided, and the coating 4. The surface of the ridge R, which is meant to receive sun beams, and the surface of the coating 4 define the air gap/air gaps 5. The air gap 5 slows down the conduction of heat from the ridge R that received solar radiation and was heated up by the radiation to the coating 4, thus also serving as an insulator. Flanks f of the ridge R form a large part of the surface of the ridge R receiving solar radiation, heating up strongly. In order to slow down the conduction, it is advantageous that the solar collector 1 comprises air gaps 5 between the flanks f of the ridge R and the coating 3. Similarly, it is advantageous that an air gap/air gaps 4 is/are provided between a peak p of the ridge and the coating 3. This enables a large part of the ridge R to become insulated from outdoor air and the coating 4. It is, however, preferable that the coating 3 is supported against the bottoms of the depressions v, as shown in the figures. This enables the coating 4 to be supported in place in a simple manner. Since the channels 2 are placed inside the ridge, the support may thus be achieved at a point where a heat bridge between the support element plane and the outdoor air, caused by the support, is the least disadvantageous. The coating then rests on the support element plane, particularly its support elements 2, at the depressions v. The coating 3 is thus supported on the bottoms of the depressions v between the ridges R next to each other provided with channels. In such a case, the coating 4 may be supported through direct contact on the bottoms of the depressions v, as is shown, but instead of direct contact, the support could alternatively be provided by an insulating member (not shown) located between the coating 4 and the support element 2. In the disclosed preferred embodiment, no air gap is provided at the point of support, enabling the support to be achieved over a large surface area in a simple manner.

The collector element plane, particularly its collector elements 2, comprise(s) at the ridges R provided with channels and on the backside thereof recesses 8. This enables the collector elements 2 to be supported against a flat structure, such as a support rib or a support plane, provided on the backside thereof such that at the ridge R the collector element 2 is not in contact with the structure provided on its backside. In such a case, an air gap is formed at the ridge R, on the backside of the collector element. For this purpose, the collector elements may be shaped as shown in the figure. Particularly, each of the collector elements 2 comprises on its backside, which is opposite to the side to be arranged to face the sun, a back surface at the depression v, and correspondingly, each of the collector elements 2 comprises on its backside a back surface at the ridge R, the back surface located at the depression v residing farther behind than the back surface located at the ridge (lower in figure).

The heat transfer medium channel 3 is preferably located at the point of the peak p of the ridge R, as shown in the figure. Preferably, on its side of the ridge R to be arranged to face the sun, the shape of the outer surface and the shape of the heat transfer medium channel 3 are symmetrical with respect to a vertical plane in the longitudinal direction of the ridge and passing through the peak of the ridge R. Preferably, only one channel 3 is provided inside the ridge R.

Each of the ridges R comprising a heat transfer medium channel 3 comprises a peak and, on opposite sides of the peak, flanks f inclined in different directions, between which the heat transfer medium channel 3 is provided. The channel 3 is preferably completely between the flanks f, in which case heat transfer to the channel 3 is efficient and fast. Heat transfer from the channel 3 further to the back structures of the support element plane of the solar collector 1 is thus also low. The flanks of the ridge R are preferably flat, in which case the dimensions of an air gap between the coating 4 and the ridge R are simple to control. Similarly, the coating is simple and quick to shape. The coating may be made e.g. by bending a plate so that the flanks of the ridges of the coating 3 are straight. It is quick and easily controllable to make straight bends in a plate, e.g. a plastic plate. The flanks f of the ridge R and the coating 4 preferably comprise mutually parallel sections.

The ridge R provided with a channel preferably (but not necessarily) further comprises therein an interior space 6, which is preferably an empty space. The space 6 is preferably tubular as the channel 3. The space 6 enables the size of the ridge to be increased without increasing the use of material. Similarly, the space 6 enables heat conduction inside the ridge R to be controlled, and inter alia heat conduction away from the ridge R to anywhere else but into the channel 3 to be slowed down. The space 6 is simple to make in a manner similar to that used for the channel 3. Preferably, except for openings provided in opposite ends of the collector element 2, the space 6 is closed. Consequently, its ventilation is low, which slows down the removal of heat.

Preferably (but not necessarily), the ridges R provided with channels cover at least a majority, preferably at least 70%, preferably at least 80%, of the cross-sectional area of the collector elements. This enables inter alia material costs to be saved.

In addition to the ridges R provided with channels, i.e. in addition to the channels comprising therein a channel 3 for a heat transfer medium, the solar collector 1 comprises a set of ridges r that comprise therein no channel 3 for a heat transfer medium. At these channelless ridges r, a tight joining point may be formed in a simple manner between collector elements next to each other. It is simpler to form a tight joining point at a ridge than on a flat section. The channelless ridges may also be used for increasing the total number of ridges to be a great one even if the channels were not densely set. This enables inter alia the surface area of the element plane to be increased. The channelless ridges may inter alia receive sun beams themselves, too, as well as reflect light to the ridges provided with channels. Similarly, this enables the stiffness of the solar collector to be affected. The solar collector 1 comprises a set of said ridges provided with channels and said channelless ridges alternately in parallel. The channelless ridges r are lower than the ridges R comprising therein a channel 3 for a heat transfer medium. Thus, the channelless ridges form no structure to overshadow the ridges R, but nevertheless provide advantages mentioned above.

A seam point is provided between collector elements 2 next to each other at the ridge r. At the seam point, the collector elements 2 next to each other comprise inclined longitudinal edges set to overlap against one another. The seam point resides higher than the level of the bottom of the depression v (in the thickness direction of the collector element plane). One of the collector elements 2 next to each other comprises a longitudinal edge 7a oriented diagonally downwards (in the thickness direction of the collector element plane), and the other of the collector elements 2 next to each other comprises a longitudinal edge 7b oriented diagonally upwards (in the thickness direction of the collector element plane), the longitudinal edges being set to overlap so that the diagonally downwards oriented longitudinal edge 7a covers the upwards oriented longitudinal edge 7b. Thus, water flowing to the seam point flows off the seam area without entering the seam. The coating 4 continues unbroken across the seam point, ensuring the waterproofness of the seam point also in this manner. No coating 4 is necessary, however, since it is not necessary that the solar collector 1 is provided with a coating 4. Even only a part of the area of the solar collector 1 may comprise a coating 4.

In the collector element plane, preferably a large number of collector elements is provided in parallel. In the disclosed embodiment, each said collector element comprises only one ridge R provided therein with a channel 3 for a heat transfer medium. This enables each channel 3 to be placed near the two flanks f of the ridge, making heat collection and transfer efficient.

Each said collector element is an element which forms a light-receiving outer surface of the ridge. Each said collector element is preferably a single-piece element made of the same material. In the preferred embodiment shown in the figures, the heat transfer medium channel is an integral part of the collector element, in which case the collector element also forms the inner walls of the channel 3. This enables the structure to be formed in a very simple manner and with few process steps. The channel 3 is tubular and, except for passage openings provided in opposite ends of the collector element, closed. This enables a continuous heat transfer medium flow to be conveyed through the collector element. Being in direct contact with the heat transfer medium, the inner walls of the channel preferably serve as surfaces to guide the heat transfer medium. Alternatively, a pipe (not shown) may be installed to run in the channel 3, the inner walls of the pipe, being in direct contact with the heat transfer medium, serving as surfaces to guide the heat transfer medium. Preferably, the pipe would then be made of metal.

Figure 5:
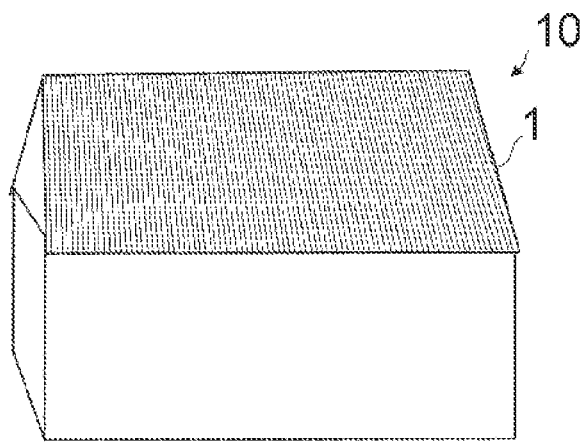
FIG. 5 shows a building according to an embodiment, comprising a building roof according to an embodiment.

FIG. 5 shows a building 10 according to an embodiment, comprising a building roof for collecting solar energy, the building roof comprising a solar collector 1 of the above-described kind which forms a part of a waterproof structure of the building roof, thus contributing to preventing water from entering the building. In such a case, the solar collector 1 is not a structure or a component placed on top of the roof but forms at least a part of a waterproof structure, a waterproof plane in particular, of the roof. The solar collector 1 is placed such that its elongated ridges R, r and elongated depressions v are oriented (particularly point in their longitudinal direction) diagonally downwards towards a lower edge of the roof. Preferably, the solar collector 1 is supported directly on a roof truss 9 located below the roof. The roof truss may be made of wood, for instance. Preferably, it is fastened to beams of the roof truss. A roof truss is a roof supporting structure which may consist e.g. of beams fastened in the form of a triangle or a cross. Alternatively, a roof truss may also be different. The solar collector 1 preferably forms a part of a solar energy recovery system, which is described in closer detail in connection with FIG. 6. A heat transfer medium is thus conveyed to run via the solar collector 1, its channels 3 in particular.

Figure 6:
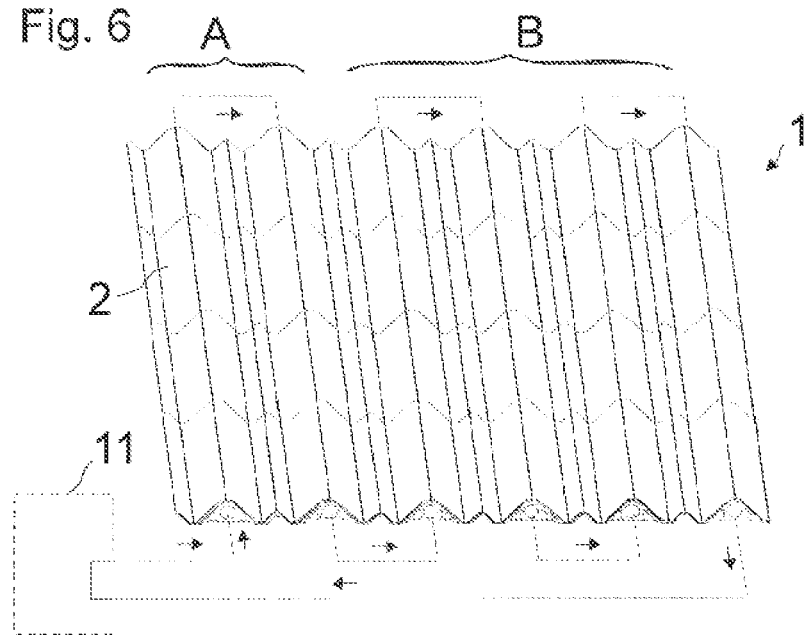
FIG. 6 shows a solar energy recovery system according to an embodiment.

FIG. 6 shows a solar energy recovery system according to an embodiment, comprising a solar collector 1 of the above-described kind and means for conveying a heat transfer medium via heat transfer medium channels 3 of the solar collector 1. The means may comprise inter alia a pipework connected to the heat transfer medium channels 3, as shown in FIG. 6, and possibly a pump or the like (not shown) for moving the heat transfer medium as is known. Preferably, the solar energy recovery system further comprises means 11 for removing heat off the heat transfer medium, the means preferably comprising means for transferring heat to where the heat is to be used or to a heat reservoir. The heat reservoir may be in the form of an underground heat storage field. The heat may be used in a household water heating system, for instance. In such a case, in the embodiment shown in FIG. 6 the means 11 for removing heat off the heat transfer medium may comprise a water reservoir via which (e.g. through the water contained therein) the pipework carrying therein the heat transfer medium runs. In FIG. 6, the collector elements 2 of the system are shown connected in series, as far as the flow of the heat transfer medium is concerned but, alternatively, the collector elements 2 of the system could be connected in parallel, as far as the flow of the heat transfer medium is concerned. All or only some of the collector elements 2 may be covered with a coating 4, as discussed above. However, the system, its solar collector 1 in particular, may alternatively be made such that some of its collector elements are not covered with the coating 4 while some of them are covered with the coating 4. For instance, collector elements 2 indicated in the figure by reference number A could be non-covered with the coating 4 while collector elements indicated by reference number B could be covered with the coating 4. In such a case, some A of the collector elements 2 may serve as pre-heating collector elements and some B of the collector elements 2 may serve as post-heating collector elements. The non-covered elements (A) may recover heat efficiently both from air and from solar radiation since the temperature of the heat transfer medium is still quite low. When the heat transfer medium thus pre-heated arrives at the covered elements (B), heat can no longer be efficiently conducted from the air to the elements 2. The post-heating of the heat transfer medium is mainly carried out through solar radiation. The cooling effect of air can be eliminated by means of the coating 4 since it insulates the elements (B) from air. In FIG. 6 in broken line successive seams which would form between the collector elements 2 in a situation wherein a single collector element 2 does not form the entire length of the solar collector, i.e. when several collector elements have been placed successively. However, the collector elements may be made to cover substantially the entire length of the collector element plane, in which case no seams shown in broken line exist. The length of the collector element 2 may be mainly or even substantially entirely as long as a distance between the ridge and the lower edge of the roof 10. The long collector elements 2 facilitate the formation of a tight structure, particularly when the solar collector 1 forms a part of the roof. In such a case, it is preferable that the solar collector 1 comprises collector elements 2 whose lengths are at least 2 meters, preferably at least 3 meters. This makes them easier and faster to mount and support in place on a roof truss, for instance.

The side of the collector element plane to be arranged to face the sun is preferably oriented diagonally or directly upwards, as shown in FIGS. 5 and 6 inter alia. Preferably, the solar collector 1 is placed such that its elongated ridges R, r and elongated depressions v and channels are oriented diagonally downwards. Preferably, the channel, the ridges R, r, the peaks p of the ridges and the depressions v are all elongated and mutually parallel. Preferably, the channel 3 is transversely with respect to its longitudinal direction completely surrounded by the collector element 2, in which case the channel 3 is tubular.

The air gap 5 does not have to be large in order to produce the insulating effect. Preferably, the air gap 5 is at the flanks of the ridge at most 5 mm in a direction of the normal of the flanks, more preferably 1 to 3 mm.

It is apparent to a person skilled in the art that as technology advances, the basic idea of the invention may be implemented in many different ways. The invention and its embodiments are thus not restricted to the examples described above but may vary within the scope of the claims.

The invention claimed is:

1. A solar collector (1) comprising:
 a collector element plane comprising a set of parallel metallic collector elements (2) for collecting solar energy, wherein the collector element plane, on its side to be arranged to face the sun, comprises a set of parallel, elongated ridges (R, r) formed by the metallic collector elements (2), and elongated depressions (v) between the ridges (R, r), wherein at least some of the ridges (R, r) comprise therein a channel (3) for a heat transfer medium; and
 a substantially solar radiation permeable coating (4) on top of the collector element plane, which forms at least a part of an outer surface of the solar collector (1), and one or more air gaps (5) provided between the coating and the ridges (R) of the collector element plane inside of which a channel (3) is provided, the coating (4) being supported at least on bottoms of the depressions (v), the coating (4) comprising on its side to be arranged to face the sun elongated ridges into the inside of which the ridges (R) of the collector elements extend, and elongated depressions between the ridges, which extend into the inside of the depressions (v) of the collector elements (2).

2. The solar collector as claimed in claim 1, wherein the metallic collector elements (2) are extruded profile pieces, each having a transverse profile that continues in a longitudinal direction of the profile piece substantially the same.

3. The solar collector according to claim 2, wherein the metallic collector elements (2) are each made of aluminum or aluminum alloy.

4. The solar collector as claimed in claim 1, wherein an air gap/air gaps (5) is/are provided between a flank/flanks (f) and/or a peak (p) of the ridges (R) inside of which a channel (2) is provided and the coating (3).

5. The solar collector as claimed in claim 1, wherein the heat transfer medium channel (3) resides at the point of the peak (p) of the ridge (R).

6. The solar collector as claimed in claim 1, wherein the ridge (R) comprises a peak (p) and, on opposite sides of the peak, flanks (f) inclined in different directions, between which a heat transfer medium channel (3) is provided.

7. The solar collector as claimed in claim 1, wherein some of the elongated ridges (R, r) formed by the collector elements (1) comprise therein no channel (3) for a heat transfer medium.

8. The solar collector as claimed in claim 1, wherein the ridges (r) comprising therein no channel (3) for a heat transfer medium are lower than the ridges (R) comprising therein a channel (3) for a heat transfer medium.

9. The solar collector as claimed in claim 1, wherein a seam point is provided between collector elements (1) next to each other at the ridge (r).

10. The solar collector as claimed in claim 1, wherein the collector elements (2) next to each other comprise inclined longitudinal edges set to overlap against one another.

11. The solar collector according to claim 1, wherein the coating is transparent.

12. The solar collector according to claim 1, wherein each collector element (2) comprises at the point of the ridge (R) provided with a channel (3) on the backside thereof a recess (8).

13. The solar collector according to claim 1, wherein each of the ridges (R) provided with a channel (3) further comprises therein a tubular interior space (6).

14. The solar collector according to claim 1, wherein the coating is in the form of a plastic plate.

15. The solar collector according to claim 14, wherein the flanks of the ridges (R) provided with a channel (3) therein are flat, and the coating (4) is in the form of a bent plate having straight spans between bends.

16. A solar energy recovery system comprising a solar collector (1) according to claim 1, and means for conveying a heat transfer medium via said channel/channels (3) for the heat transfer medium.

17. A solar energy recovery system according to claim 16 comprising a building roof, and said solar collector (1) forms at least part of the waterproof structure of the building roof.

18. A building (10) comprising a solar collector (1) according to claim 1.

19. A building (10) according to claim 18 comprising a building roof, and said solar collector (1) forms at least part of the waterproof structure of the building roof.

20. A building (10) according to claim 19, wherein the solar collector (1) is placed such that its elongated ridges (R, r) and elongated depressions (v) are oriented diagonally downwards towards the lower edge of the roof.

21. A building roof for collecting solar energy, the roof comprising a solar collector (1) according to claim 1, which forms at least a part of the waterproof structure of the building roof.

22. A building roof for collecting solar energy according to claim 21, wherein the solar collector (1) is placed such that its elongated ridges (R, r) and elongated depressions (v) are oriented diagonally downwards towards the lower edge of the roof.

* * * * *